Patented May 4, 1943

2,318,540

UNITED STATES PATENT OFFICE 2,318,540

CALCIUM SULPHATE COMPOSITION

Guy W. Talbert, Summit, N. J., assignor to Allied Chemical & Dye Corporation, a corporation of New York No Drawing. Application February 19, 1941, Serial No. 379,643

20 Claims. (Cl. 106—111)

This invention relates to calcium sulphate compositions (e. g. gysum compositions) containing an added agent which imparts desirable properties to the compositions.

Gypsum compositions have been used for the preparation of plasters, stuccos and mortars, and for casting or molding to produce rigid structures ranging from dense, non-porous masses to light, porous masses. In the production of rigid structures from gypsum compositions difficulty is encountered in forming structures of adequately high strength, resistance to cracking and with surface characteristics favorable for the spreading of coating materials.

It has been proposed heretofore to incorporate wetting agents in gypsum mortars or slurries in order to promote admixture of water with the calcined gypsum component and to avoid formation of air pockets or voids in casts, molds or other structures made from such gypsum compositions. Although in some cases it has been noted that the incorporation of wetting agents in a gypsum composition has resulted in a slight increase in strength of the corresponding cast or molded article, it has been found generally that the wetting agents heretofore incorporated in gypsum compositions have not improved to any material degree the physical characteristics, e. g., strength and surface characteristics, of rigid articles made therefrom.

It is an object of this invention to prepare a new composition of gypsum or other calcium sulphate, containing a minor proportion of certain alkyl aryl sulphonates, which composition is in the form of or may be converted into a rigid structure of great strength and remarkably improved properties as compared with rigid gypsum structures not containing these sulphonates.

It is a further object of this invention to prepare a dry calcined gypsum composition containing a small quantity of said sulphonates, which composition may be made into a plastic mass, e. g., stucco, mortar or plaster, by gauging with water and used to form rigid structures by casting, molding, plastering, or other means, which rigid structures possess the remarkable properties above discussed.

It is a further object of this invention to provide a new process for forming calcium sulphate compositions of greatly improved physical characteristics.

In accordance with this invention, I have produced a new calcium sulphate composition which comprises calcium sulphate in anhydrous, partially hydrated, or completely hydrated form (e. g., gypsum or calcined forms thereof), and which has incorporated therein a minor proportion, preferably not more than about 2%, of an alkyl aryl sulphonate wherein the alkyl group is a nuclear substituent and contains from 8 to 19 carbon atoms. In the preferred composition of my invention there is incorporated with gypsum or calcined gypsum a mixture of alkyl aryl sulphonates whose alkyl groups are derived from petroleum fractions, at least 80% of whose component hydrocarbons contain from 8 to 19 carbon atoms per molecule, particularly alkyl aryl sulphonates in which the aryl group is derived from benzene or phenol and the alkyl group is derived from a kerosene fraction whose boiling range indicates that it consists predominantly of hydrocarbons containing 13 to 16 carbon atoms per molecule.

The composition of my invention may be in the form of a rigid structure or may be convertible into a rigid structure. The rigid structures thus produced may range from a dense and non-porous mass to a light and porous mass, and are characterized by remarkably high strength, unusually low tendency to crumble or crack, favorable surface characteristics for reception of finishes, and other highly desirable properties in contradistinction to similar rigid masses made from gypsum compositions not having incorporated therein alkyl aryl sulphonates as above described.

Among the forms in which the composition of my invention may be prepared is that of a dry, coarsely powdered mixture comprising calcined gypsum and an alkyl aryl sulphonate as above described. The calcined gypsum (e. g., plaster of Paris) is natural gypsum which has been at least partially dehydrated by heating. Such mixtures are suitable for gauging with appropriate amounts of water to form temporarily plastic masses, which when allowed to set, spontaneously harden, by rehydration of the calcined gypsum, to form rigid masses or articles. The plastic masses and the rigid structures formed therefrom upon hardening, as well as the dry powdered mixture from which they are made, (i. e., the calcined gypsum and alkyl aryl sulphonates as above described), are all new calcium sulphate compositions coming within the scope of my invention. The dry mixtures in coarsely powdered condition are an especially valuable form of my invention, as they can be stored indefinitely without deteriorating if kept dry and are easily used by those skilled in the art to produce mortar or plaster for plastering walls, molding into cast articles, preparing molds for making casts, for making porous rigid articles, and for other uses.

The calcium sulphate composition may also contain other components, for example granular mineral matter such as sand or crushed stone, or fibrous material such as hair or wood fiber, as well as impurities normally present in gypsum deposits found in nature. Agents to retard or hasten the rate of hardening of calcined gypsum when mixed with water may be present and, in fact, are helpful in obtaining desired properties for compositions for various uses. My compositions may be colored, e. g., by addition of suitable organic or inorganic pigments. My compositions in rigid or hardened form may be coated with paints, enamels, lacquers, rubber, metal or other coating materials. My compositions in rigid form may be associated with structural supporting or reinforcing elements made, for example, of wood, steel or other suitable material.

The alkyl aryl sulphonates, which comprise a minor proportion of the composition of my invention, are aromatic compounds containing a nuclear sulphonic acid group or sulphonate substituent which makes the compound readily soluble in water, and a nuclear alkyl substituent containing from 8 to 19 carbon atoms. The aromatic residue may be derived from a mononuclear or polynuclear carbocyclic or heterocyclic compound. It may be free from substituents, or it may contain one or more atoms or groups attached to the carbon or other atoms of the nucleus, the following substituents being cited as examples: one or more hydroxyl radicals, one or more alkyl groups, one or more sulphonic acid radicals, or one or more of the atoms or radicals Cl, Br, I, F, $NO_2$, $NH_2$, COOH, $CONH_2$, $NHR_1$, $NR_1R_2$, $COOR_1$, $COR_1$, $CONHR_1$, $OR_1$, $SR_1$, $SO_3R_1$, and $R_1$ (in which $R_1$ and $R_2$ represent any alkyl, aryl, heteroaryl, alkaryl, aralkyl, cycloalkyl or heterocyclic radical, which groups or radicals may be further substituted or not, and if more than one is present it may be the same or different). As examples of these compounds there may be mentioned benzene, a benzene homolog such as toluene or xylene, phenol, a phenol homolog such as cresol or xylenol, methoxyphenol, phenetol, salicylic acid, pyrogallol, naphthalene, naphthol, diphenyl, hydroxyquinoline, and similar compounds.

The alkyl substituent containing 8 to 19 carbon atoms may be introduced into the aromatic compound by means of alkylating agents such as non-aromatic alcohols (for example, primary, secondary or tertiary aliphatic alcohols of the straight chain or branched chain types, naphthenic or cycloaliphatic alcohols, etc.), olefinic hydrocarbons containing a straight or branched chain and containing one or more double bonds which may be variously located in the hydrocarbons, halogen derivatives of the hydrocarbons (for example, chlorides or bromides of the saturated and unsaturated hydrocarbons of the aliphatic class), and derivatives of all of these compounds, all containing more than 7 but less than 20 carbon atoms in the alkyl chain.

It is advantageous to use as the source of the alkyl radical for introduction into the aromatic nucleus naturally occurring or synthetically prepared non-aromatic hydrocarbon mixtures. For example, the various fractions of petroleum distillates, hydrogenated coal distillates, polymerized olefins, etc., represent available and inexpensive sources of alkylating agents for the preparation of higher alkyl aromatic sulphonates. The preferred alkylating agent is the mixture of chlorhydrocarbons resulting from the chlorination of a selected petroleum distillate, preferably of the kerosene boiling range. Such a mixture of chlorhydrocarbons may be prepared, for example, by chlorinating with gaseous chlorine a kerosene fraction of the petroleum until about one and one-fourth times the amount of chlorine theoretically necessary to yield the monochlor substitution products of the hydrocarbon mixture has been absorbed. The resulting chlorination product consists of a mixture of monochlor hydrocarbons, together with some highly chlorinated hydrocarbons and unchlorinated hydrocarbons.

An alkylating agent, as described above, may be reacted with an aromatic compound to introduce an alkyl radical into the aromatic nucleus by means of a condensing agent such as anhydrous zinc chloride, anhydrous aluminum chloride, anhydrous antimony chloride, anhydrous ferric chloride, zinc, or sulphuric acid (66° Bé., 100% $H_2SO_4$, or oleum). The choice of condensing agent, the time of reaction and other conditions will vary with the alkylating agent employed, as is well known in the art.

To sulphonate the alkyl aromatic compound there may be employed as sulphonating agent sulphuric acid of various strengths, chlor sulphonic acid, and the like, and the sulphonation may be carried out in the presence of an inert solvent and a sulphonation assistant, as is well understood in the art.

The sulphonic acids produced as above described may be converted to salts by reacting the sulphonated product, either in crude form resulting from the sulphonation, or in a purified form, with a metal oxide or hydroxide, ammonia, or an organic base, or a suitable salt of one of these, in an amount adapted to form a neutral product. Among the bases and oxides or salts which may be combined with the sulphonated products to produce salts are, for example, sodium, potassium and ammonium hydroxide, sodium, potassium and ammonium carbonate and bicarbonate, ammonia, magnesium oxide, and organic amines such as ethyl amine and triethanolamine.

The alkyl aryl sulphonates used in the composition of my invention may be either in the form of salts or in the form of the free acids; the term "alkyl aryl sulphonates" as used in the specification and claims is intended to include both salts and free acids. The preferred form of sulphonated product for use in the gypsum composition of my invention is the alkali metal or alkaline earth metal salt of the sulphonic acid, particularly the sodium salt. Sodium sulphate formed by neutralization of the sulphonation reaction product is preferably allowed to remain in the product and may constitute a major proportion of the alkyl aryl sulphonate composition which is added to the gypsum. As above indicated, the preferred alkyl aryl sulphonates for use in the composition of the present invention are derived by using as the source of the aryl group a compound of the benzene series, i. e. a mononuclear carbocyclic aromatic compound, particularly unsubstituted benzene or phenol, and by using as the source of the alkyl group a kerosene fraction whose boiling range indicates that it consists predominantly of hydrocarbons containing 13 to 16 carbon atoms per molecule. Although the composition of my invention may contain other components besides calcium sulphate and alkyl aryl sulphonates, as indicated above, the calcium sulphate is present in such proportion that a mass formed of my composition owes its rigidity or its ability to become rigid upon standing, or upon gauging with water and standing, to the presence of calcium sulphate in either the anhydrous, partially hydrated, or completely hydrated form. Gypsum is the common source of calcium sulphate for structural purposes, and the term "gypsum" is used in the specification and claims in its broad sense to denote either the calcined or hydrated form thereof. The proportion of alkyl aryl sulphonate component may vary up to 2 parts by weight per 100 parts of the dry calcium sulphate component (not including material such as mineral matter or fibrous material associated with gypsum). The preferred proportion of alkyl aryl sulphonate component is in the range from about 0.001 to 1 part of the alkyl aryl sulphonate, and particularly in the range from about 0.01 to 0.5 part of the alkyl aryl sulphonate, per 100 parts of the calcium sulphate component.

The method by which the alkyl aryl sulphonate is incorporated in the composition may be varied, depending upon the use to which the final composition is to be put. For example, in preparing a dry mix which is to be stored and later gauged with water to form a gypsum mortar or plaster, the alkyl aryl sulphonate may be powdered and mixed mechanically with the ground calcined gypsum, or the alkyl aryl sulphonate in the form of a concentrated solution may be sprayed on the hot gypsum as it emerges from the calciner. When the gypsum composition of this invention is to be prepared in plastic form for production of rigid structures, the alkyl aryl sulphonate may be dissolved in the water used to gauge a dry composition comprising calcined gypsum as the principal hardening component. For example, in the preparation of rigid structures of a light porous character, a solution of the alkyl aryl sulphonate in the water to be used for gauging the calcined gypsum may be prepared, subjected to brisk agitation, and commercial plaster of Paris (calcined gypsum) added thereto gradually with continued agitation until the desired porous plastic mass is obtained.

The following examples are illustrative of my invention:

EXAMPLE 1

A sanded wood-fiber grade of a calcined gypsum plaster was mixed with a finely ground alkyl aryl sulphonate product in various proportions as indicated in Table 1 below. The alkyl aryl sulphonate product consisted of about 40% alkyl aryl sodium sulphonate and about 60% sodium sulphate, and was prepared by the following process. All parts are by weight.

PREPARATION OF ALKYL ARYL SULPHONATE PRODUCT 5,310 parts of Pennsylvania kerosene (boiling range 185° to 275° C.) were charged into a lead-lined kettle fitted with lead-covered agitator, thermometer well and other accessories. 2.2 parts of iodine were dissolved in the agitated kerosene charge which was warmed to about 60° C. and maintained between 60° C. and 70° C. while chlorine gas was passed into the liquid until the specific gravity of the chlorinated kerosene had changed from 0.788 at 24° C. before to 0.918 at 24° C. after the chlorination. The amount of chlorine required for the purpose was about 2,412 parts. The final chlorinated hydrocarbon thus obtained was condensed in portions with benzene.

A mixture of 6,636 parts of benzene and 166 parts of anhydrous aluminum chloride was agitated and 3,318 parts of the foregoing chlorinated kerosene mixture were slowly added thereto, during which addition the temperature of the mass rose to about 35° C. The mixture was then heated to 45° C. and held there. Agitation was stopped and the mixture allowed to stand to bring about layer separation; thereafter the lower tarry layer was withdrawn. The upper layer was conveyed to a stripping kettle in which the liquid was stripped of low-boiling hydrocarbons, chiefly benzene, by boiling the liquid at 150° C., first under atmospheric pressure and finally under reduced pressure at 3 to 4 inches of mercury absolute pressure. The material left after this stripping was distilled in vacuo until about 7% of the charge in the still had been removed as distillate. The remaining distilland was distilled, and distillate therefrom was collected separately until the boiling point of the distilland was 250° C. at 14 mm. mercury pressure. This last distillate was chiefly the condensation product of the chlorinated hydrocarbons of the kerosene fraction and the benzene; for convenience it is called "keryl benzene."

The keryl benzene was washed with 100% sulphuric acid by mixing it with about 15% of its weight of acid, and agitating the mixture in an enamel-lined kettle for about one hour at about 40° C. The mixture was allowed to stand for about a half-hour to permit separation of the acid which constituted the lower layer and was withdrawn and discarded.

The upper acid-washed layer of keryl benzene was mixed in an enamel-lined kettle with about 1.25 times its weight of 100% sulphuric acid at a temperature between 30° and 35° C. The mixture was then warmed to 55° C. and agitated at that temperature for one hour. It was then allowed to stand for two hours, during which time three layers of material separated. The upper layer was chiefly unsulphonated material, the middle portion was chiefly sulphonated keryl benzene, and the lower layer was spent sulphuric acid. The middle layer was separated from the others, drowned in ice water, and neutralized with an aqueous solution of caustic soda.

At this stage, the solute in the solution contained substantially 63% by weight sodium keryl benzene sulphonate and 37% by weight inorganic salts, e. g., sodium sulphate. 4,295 parts of sodium sulphate were then dissolved in the neutralized keryl benzene sulphonate solution. The resulting solution was dried on a double drum drier. The dried product contained about 60% by weight of inorganic salt, mostly sodium sulphate.

PREPARATION OF GYPSUM COMPOSITION

An alkyl aryl sulphonate product prepared as above described was mixed with the calcined gypsum plaster by hand, with careful avoidance of any grinding of the plaster particles in order not to change the character of the plaster mix, e. g., by crushing sand grains or by breaking down the wood fibers, or the like. One plaster sample was prepared which contained no alkyl aryl sulphonate; this sample, to be used as a blank in the experiment, was submitted to the same mechanical manipulation as the samples to which the alkyl aryl sulphonate was added.

The dry plaster mixtures were then gauged with water, using 250 parts of water for 600 parts of plaster; this is an amount of water which produces a favorable structure with this plaster when put to its ordinary use. Six briquettes were then cast from each of five mixtures having alkyl aryl sulphonate contents as indicated below, using the standard mold described in A. S. T. M. Standards (1936), part 2—Designation, C-77-32. Immediately after casting, the molds and briquettes were placed in a moist cabinet and kept there for twenty-four hours. The briquettes were then removed from the molds and allowed to air-dry for six days under ordinary room conditions. At the end of this time the briquettes had a dry, finished appearance and were judged ready for testing. This was done by breaking the briquettes in a tensile-strength testing machine of the standard type. The results tabulated below are average results based on testing the six briquettes from each plaster mixture:

Table 1

| Sample number | Proportion of alkyl aryl sulphonate product | Average tensile strength in lbs. per square inch |
|---|---|---|
| | Per cent | |
| 1 | None | 86.4 |
| 2 | .01 | 113.5 |
| 3 | .10 | 129.8 |
| 4 | .30 | 121.2 |
| 5 | 1.00 | 108.0 |

It is noted that even with .01% of the alkyl aryl sulphonate product incorporated in the gypsum composition, the increase in tensile strength was over 30%, and with .10% of the alkyl aryl sulphonate product the increase in strength was over 50%.

EXAMPLE 2

A large batch of standard wood-fiber grade of plaster used in Example 1 was mixed with 0.1% by weight of the alkyl aryl sulphonate product described in Example 1; the mixing was carried out as in Example 1. This plaster mixture was tested against a portion of the standard wood-fiber plaster to which no addition agent was added. The testing was done as follows:

One side of a wooden packing case was covered with laths, laid in such a manner as to simulate customary wall construction. Two sections of the lath-covered side of the packing case were then plastered, respectively, with each of the two plaster mixtures mentioned above (one containing .1% of alkyl aryl sulphonate product, and the other not containing any addition agent). The plaster mixtures were gauged in water and applied, using usual plastering technique and tools. The plastering was done in a warm, dry room. As the plaster dried it was observed that the plaster containing the alkyl aryl sulphonate showed practically no tendency to crack, while the untreated plaster sample showed a number of cracks. The ability of my composition to produce satisfactory plastering jobs under adverse conditions is an important advantage of my invention.

After the plaster had dried thoroughly, the two plastered sections of the packing case were painted (1) with a casein paint, (2) with a paint containing an emulsified oil vehicle, and (3) with a glue size in aqueous solution. With all three coating compositions it was observed that the composition spread more easily and required less brushing on the plaster containing the alkyl aryl sulphonate. This easier application of decorative coatings is a further important advantage of my novel composition when in rigid form.

EXAMPLE 3

This example illustrates the use of my novel composition for preparing light, porous, rigid objects characterized by high mechanical strength and by uniformity and fineness of the porosity. In this example, samples were prepared using various alkyl aryl sulphonate compositions coming within the scope of my invention, i. e., alkyl aryl sulphonates in which a nuclear alkyl substituent contained from 8 to 19 carbon atoms. For purposes of comparison, other samples were prepared in exactly the same manner using alkyl aryl sulphonates outside the scope of my invention, i. e. alkyl aryl sulphonates in which the alkyl groups contained less than 8 carbon atoms. Other samples were prepared in which no alkyl aryl sulphonates were used.

Agents A, B, C and D, prepared as described below, are alkyl aryl sulphonate products coming within this invention. Agent E, described below, is an alkyl aryl sulphonate product outside the scope of this invention.

PREPARATION OF AGENT A

Agent A was prepared by a method similar to that described in Example 1 except that the keryl benzene sulphonic acid was largely separated from unreacted sulphuric acid before neutralization of the sulphonation mix, in order to cut down the inorganic salt content of the final product. Agent A contained about 90% of keryl benzene sodium sulphonate and about 10% of sodium sulphate.

PREPARATION OF AGENT B

Agent B was the same product as used in Example 1, namely a product containing about 40% keryl benzene sodium sulphonate and about 60% sodium sulphate.

PREPARATION OF AGENT C

Agent C contained about 40% keryl phenetole sodium sulphonate and about 60% sodium sulphate, and was prepared as follows:

The kerosene used was derived from Pennsylvania petroleum. The kerosene boiled over the range 208° to 280° C. at atmospheric pressure with 80% distilling within the range 233° to 267° C. The kerosene had a specific gravity of about 0.789 at 24° C.

533 pounds of kerosene were charged into a lead-line vessel fitted with agitation. 0.25 pound of iodine were dissolved with agitation and a stream of chlorine run in at a rate of 40 to 50 pounds of chlorine per hour. The temperature was held at 45° to 55° C. during chlorination, which was continued until the specific gravity of the chlorinated kerosene was 0.920 at 24° C. 327 pounds of chlorinated kerosene, prepared as described above, and 164 pounds of phenol were charged into a cast-iron jacketed kettle. The agitation was started and 33 pounds of anhydrous zinc chloride were charged into the kettle during the course of ten minutes, the temperature being held below 50° C. The batch was then gradually heated to 160° C. during two to three hours and held at 160° C. for five hours with continued agitation. Then heating was discontinued, the agitation stopped, and the batch allowed to settle for at least four hours. The oil layer (crude keryl phenol) was then drawn off from the zinc chloride settlings which were discarded.

The crude keryl phenol was then charged to a suitable kettle and stripped under reduced pressure not exceeding 50 mm. of mercury. A small amount of caustic soda was added to the crude keryl phenol before distilling, to aid in controlling corrosion difficulties.

239 pounds of stripped keryl phenol were charged into an iron kettle fitted with agitation. 73 pounds of 50% caustic soda solution were charged with agitation and the temperature adjusted to 75° to 85° C. 68 pounds of diethyl sulphate were then charged in gradually during the course of one hour with continued agitation, the temperature being held at 80° to 90° C. The batch was then gradually heated to 135° C. during about three hours, a slight vacuum (i. e., an absolute pressure of about 26 to about 28 inches of mercury) being maintained. The vacuum was then released and the batch was cooled to 110° C. 239 pounds of water were then added and 50° Bé. sulphuric acid (about 5 pounds) was run in until a strong acid reaction was obtained. After agitating at 80° to 90° C. for fifteen minutes, the agitation was stopped and the batch allowed to stand for about one hour. The lower aqueous layer was drawn off and discarded.

The water-insoluble oil (crude keryl phenetole) was treated with a small amount of caustic to overcome acidity and dried by heating to 110° to 120° C. under a slight vacuum (i. e., an absolute pressure of about 24 to 26 inches of mercury).

The crude dried keryl phenetole was charged to a still together with 1% of its weight of flake caustic soda. The crude keryl phenetole was then distilled, distillation commencing at about 102° C., under an absolute pressure of 12 mm. of mercury. Samples of the distillate were collected and tested for solubility in an equal volume of 100% sulphuric acid. When the vapor temperature in degrees centigrade was about 113° at an absolute pressure of 5 mm. of mercury a test sample of the distillate was soluble in 100% sulphuric acid to the extent of 10%. The distillate collected up to this point was discarded. Distillation was continued and the distillate collected until the vapor temperature was 271° C. at an absolute pressure of 21 mm. of mercury.

107 pounds of distilled keryl phenetole were charged into an enamel-lined kettle fitted with an enameled agitator and other suitable accessories. 188 pounds of 100% sulphuric acid were then charged slowly and evenly during one to two hours with agitation, the temperature being kept at 15° to 20° C. The batch was next warmed to 25° to 30° C. and agitation continued for three hours, at which time a neutralized test sample was completely soluble in distilled water.

The sulphonation mixture was then run into an agitated mixture of 167 pounds of water, 800 pounds of cracked ice, and 1 pound of disodium phosphate. The diluted sulphonation mixture was neutralized with 300 pounds of caustic soda (50% solution), taking care to keep the temperature below 30° C. The neutralized solution was dried on a double drum drier yielding 350 pounds of product consisting mainly of keryl phenetole sulphonate and sodium sulphate. The product contained more than 60% inorganic salt, most of which was sodium sulphate.

PREPARATION OF AGENT D

Agent D consists of about 50% keryl phenol sodium sulphonate and about 50% sodium sulphate, and was prepared as follows:

Chlorine was passed into a kerosene (a purified Pennsylvania petroleum distillate) boiling from 245° to 315° C., of which 90% distilled between 260° and 305° C., and having a specific gravity of 0.815, contained in a closed, lead-lined vessel which was equipped with a vent for hydrogen chloride produced by the chlorination. The chlorination was carried out in the dark, but to facilitate the chlorination the kerosene initially contained about 0.45 part of iodine per 1,000 parts of kerosene. The temperature of the reaction mass was preferably maintained at about 45° to 50° C. The introduction of chlorine was continued until the weight of the mass increased to an extent corresponding substantially with 115% of the theoretical amount for the formation of monochloride. The specific gravity of the reaction mixture reached about 0.915.

560 parts of the resulting mixture of chlorinated hydrocarbons, 350 parts of phenol and 28 parts of granular anhydrous zinc chloride were agitated at room temperature for about three hours and then heated, with agitation, at about 135° C. for about five hours. The resulting reaction mass was cooled and added to about 600 parts of water, the mixture was heated to 70° C. with agitation, allowed to settle, and the upper oil layer separated and washed with hot water to remove zinc chloride and residual phenol. The washed oil was then treated with a small amount of alkali (7 parts of a 50% solution of sodium hydroxide) and distilled under an absolute pressure not exceeding 50 mm. of mercury in a still equipped with a fractionating column. Distillate boiling up to about 140° C. at 40 mm. of mercury absolute pressure was removed.

262 parts of the remaining distilland were sulphonated by agitating well with 314 parts of 100% sulphuric acid, while maintaining the temperature at 20° to 30° C. When the sulphonation had been effected, the reaction mass was drowned in 1,500 parts of water, treated with sufficient caustic soda to render it neutral to Delta paper (about 260 parts of a 50% solution of caustic soda), and evaporated to dryness.

PREPARATION OF AGENT E

Agent E consisted of isopropylated naphthalene sodium sulphonate and was prepared as follows:

90 parts of water were mixed with 1150 parts of sulphuric acid monohydrate in a suitable reactor equipped with an agitator and vent. The mixture was agitated and cooled to 15° C. 495 parts of isopropyl ether were added over a period of three-quarters of an hour as the temperature was allowed to rise to 45° to 50° C. 775 parts of ground naphthalene were then added and the mixture was agitated at 40° to 50° C. for three hours. 165 parts of isopropyl ether were added over a period of one-half hour, keeping the temperature below 50° C. The batch was then agitated at 50° C. to 60° C. for ten hours. The agitator in the reactor was stopped and the mix was allowed to settle for at least four hours. The lower layer of spent acid was drawn off and discarded. 1,160 parts of sulphuric acid monohydrate were stirred over a period of one hour into the upper layer, which was an oil containing mono- and poly-isopropylated naphthalene, but was largely di-isopropylated naphthalene, and the reactor contents, which had been heated spontaneously to 70°–75° C. during the sulphuric acid addition, were agitated at that temperature for two hours. The sulphonation mass was then drowned in cold water, limed and sodated in the usual manner and the filtered aqueous solution, which contained chiefly sodium isopropylated naphthalene sulphonates, was evaporated to dryness. The final product was a brown-yellow to white friable solid which was chiefly a mixture of sodium isopropylated naphthalene sulphonates. It was readily soluble in water.

PRODUCTION OF GYPSUM COMPOSITIONS

Each of the alkyl aryl sulphonate products above described was dissolved in water in the concentration indicated in Table 2 below. 30-cc. samples of the various solutions were each placed in a 500-cc., graduated, glass cylinder (inner diameter, about 4.6 cm.; height, about 36 cm.) and beaten up to a foam by rapidly moving up and down within the cylinder a loosely fitting circular aluminum plunger which was pierced by a number of holes. After about three minutes of brisk agitation with the perforated plunger, 60 grams of commercial plaster of Paris (calcined gypsum) were added in portions during about one minute with continued agitation. The resulting plastic compositions were then transferred to 150-cc. beakers and allowed to harden and air-dried at room temperature for about one week. The apparent densities of the resulting rigid masses were then calculated as the ratio of the weight to the volume occupied. The data are tabulated in Table 2 below:

Table 2

| Sample number | Alkyl aryl sulphonate product employed | Concentration of alkyl aryl sulphonates in water | Per cent alkyl aryl sulphonate—based on dry plaster of Paris | Apparent density | Remarks |
|---|---|---|---|---|---|
| | | Per cent | | Grams per cc. | |
| 1 | A | 2.0 | .9 | .548 | Medium porosity; no tendency to crumble. |
| 2 | A | 1.0 | .45 | .658 | |
| 3 | A | .5 | .225 | .690 | Fine porosity; high strength; free of tendency to crumble. |
| 4 | A | .2 | .09 | .757 | |
| 5 | A | .1 | .045 | .968 | |
| 6 | B | 2.0 | .40 | .554 | |
| 7 | B | 1.0 | .20 | .690 | |
| 8 | B | .5 | .10 | .897 | |
| 9 | C | 1.0 | .20 | .933 | Very fine porosity; no tendency to crumble. |
| 10 | D | 1.0 | .25 | 1.050 | |
| 11 | E | 1.0 | .50 | .535 | Crumbly; coarse porosity. |
| 12 | E | .5 | .25 | .463 | |
| 13 | None | 0 | 0 | 1.325 | Non-porous. |

As above noted, the porous rigid structures prepared in accordance with my invention are differentiated by their increased uniformity and fineness of porosity, their greater mechanical strength, and their freedom from any tendency to crumble, as contrasted to the easily crumbled rigid structures of similar compositions in which the alkyl aryl sulphonate component is outside the scope of my invention.

As above indicated, the composition of my invention may advantageously be used in molding, casting, plastering and similar uses, since the rigid structures thus formed have unusually high mechanical strength, are better suited for plastering walls, are more resistant to cracking, and can be more easily decorated with various finishes and coatings. My porous composition is especially well suited for making blocks for construction purposes, for making wallboard by sandwiching between heavy paper sheets, for plastering, and to produce walls or other articles having low heat- and sound-conductivity. The composition of my invention has further advantages in that the alkyl aryl sulphonate component has a disinfectant and deodorizing action which is of importance, especially in connection with calcined gypsum compositions used by the medical profession; the composition of my invention is accordingly of advantage in the production of plaster casts and for similar medical and biological purposes.

The expression "structural calcium sulphate" is used in the claims to mean calcium sulphate in a form suitable for gauging with water to produce plastic masses which set to form rigid masses, as well as calcium sulphate in the form it takes in such rigid and plastic masses.

Since certain changes may be made in the above composition and different embodiments of the invention could be made without departing from its scope, it is intended that all matter contained in the above description shall be interpreted as illustrative and not in a limiting sense.

What is claimed is:

1. A composition comprising structural calcium sulphate and a small proportion of an alkyl aryl sulphonate in which the alkyl group is a nuclear substituent and contains from 8 to 19 carbon atoms.

2. A composition comprising structural calcium sulphate in association with a small amount of a mixture of alkyl aryl sulphonates whose alkyl groups are derived from petroleum fractions, at least 80% of whose component hydrocarbons contain 8 to 19 carbon atoms per molecule.

3. A composition comprising structural calcium sulphate having incorporated therein not more than about 2%, based on the calcium sulphate component, of an alkyl aryl sulphonate in which the aryl group is of the benzene series and the alkyl group is a nuclear substituent containing from 8 to 19 carbon atoms.

4. A composition comprising structural gypsum having incorporated therein not more than about 2%, based on the gypsum component, of a mixture of alkyl aryl sulphonates selected from the group alkyl benzene sulphonates and alkyl phenol sulphonates whose alkyl groups are nuclear substituents and are derived from a kerosene fraction whose boiling range indicates that it consists predominantly of hydrocarbons containing 13 to 16 carbon atoms per molecule.

5. A composition comprising structural calcium sulphate having incorporated therein not more than about 2%, based on the calcium sulphate component, of an alkyl aryl metal sulphonate in which the metal is selected from the group consisting of alkali metals and alkaline earth metals, and in which the alkyl group is a nuclear substituent containing from 8 to 19 carbon atoms.

6. A composition comprising structural gypsum having incorporated therein from about 0.001% to 1%, based on the gypsum component, of a mixture of alkyl aryl metal sulphonates selected from the group alkyl benzene sulphonates and alkyl phenol sulphonates, in which alkyl aryl metal sulphonates the metal is selected from the group consisting of alkali metals and alkaline earth metals, and in which the alkyl groups are nuclear substituents and are derived from a kerosene fraction whose boiling range indicates that it consists predominantly of hydrocarbons containing 13 to 16 carbon atoms per molecule.

7. A composition comprising structural gypsum having incorporated therein from about 0.01% to 0.5%, based on the gypsum component, of a mixture of alkyl aryl metal sulphonates selected from the group alkyl benzene sulphonates and alkyl phenol sulphonates, in which alkyl aryl metal sulphonates the metal is selected from the group consisting of alkali metals and alkaline earth metals, and in which the alkyl groups are nuclear substituents and are derived from a kerosene fraction whose boiling range indicates that it consists predominantly of hydrocarbons containing 13 to 16 carbon atoms per molecule.

8. A composition comprising structural gypsum having incorporated therein from about 0.01% to 0.5%, based on the gypsum component, of a mixture of alkyl aryl sulphonates in which the aryl groups are of the benzene series and the alkyl groups are nuclear substituents and are derived from petroleum fractions, at least 80% of whose component hydrocarbons contain 8 to 19 carbon atoms per molecule.

9. A dry powdered composition comprising calcined gypsum suitable for gauging with water to form plastic masses which, when allowed to set, form rigid masses, said composition having incorporated therein a small proportion of an alkyl aryl sulphonate in which the alkyl group is a nuclear substituent and contains from 8 to 19 carbon atoms.

10. A dry powdered composition comprising calcined gypsum suitable for gauging with water to form plastic masses which, when allowed to set, form rigid masses, said composition having incorporated therein not more than about 2%, based on the gypsum component, of an alkyl aryl sulphonate in which the aryl group is of the benzene series and the alkyl group is a nuclear substituent containing from 8 to 19 carbon atoms.

11. A plastic mass having the ability to become rigid through hydration of calcium sulphate present in the mass, said mass comprising, in addition to said calcium sulphate, water and a small proportion of an alkyl aryl sulphonate in which the alkyl group is a nuclear substituent and contains from 8 to 19 carbon atoms.

12. A plastic mass having the ability to become rigid through hydration of calcium sulphate present in the mass, said mass comprising, in addition to said gypsum, water and not more than about 2%, based on the weight of the dry components, of an alkyl aryl sulphonate in which the aryl group is of the benzene series and the alkyl group is a nuclear substituent containing from 8 to 19 carbon atoms.

13. A rigid structure, the rigidity of which is due to the presence of hydrated calcium sulphate, said structure containing, in association with said calcium sulphate, a small proportion of an alkyl aryl sulphonate in which the alkyl group is a nuclear substituent and contains from 8 to 19 carbon atoms.

14. A rigid structure, the rigidity of which is due to the presence of gypsum, said structure containing, in association with said gypsum, not more than about 2%, based on the gypsum component, of an alkyl aryl sulphonate in which the aryl group is of the benzene series and the alkyl group is a nuclear substituent containing from 8 to 19 carbon atoms.

15. A light rigid porous structure characterized by its uniform porosity and high strength, the rigidity of which is due to the presence of hydrated calcium sulphate, said structure containing, in association with said calcium sulphate, a small proportion of an alkyl aryl sulphonate in which the alkyl group is a nuclear substituent and contains from 8 to 19 carbon atoms.

16. A light rigid porous structure characterized by its uniform porosity and high strength, the rigidity of which is due to the presence of gypsum, said structure containing, in association with said gypsum, not more than about 2%, based on the gypsum component, of an alkyl aryl sulphonate in which the aryl group is of the benzene series and the alkyl group is a nuclear substituent containing from 8 to 19 carbon atoms.

17. In a process for production of structural calcium sulphate compositions, the step which comprises incorporating into the composition a small proportion of an alkyl aryl sulphonate in which the alkyl group is a nuclear substituent and contains from 8 to 19 carbon atoms.

18. In a process for production of structural calcium sulphate compositions, the step which comprises incorporating into the compositions not more than about 2%, based on the calcium sulphate component, of an alkyl aryl sulphonate in which the alkyl group is derived from a petroleum fraction and contains from 8 to 19 carbon atoms.

19. In a process for production of structural gypsum compositions, the step which comprises incorporating into the composition from about 0.001% to 1%, based on the gypsum component, of an alkyl aryl sulphonate in which the aryl group is derived from the benzene series and the alkyl group is a nuclear substituent derived from a petroleum fraction and contains from 8 to 19 carbon atoms.

20. In a process for production of structural gypsum compositions, the step which comprises incorporating into the composition from about 0.01% to 0.5%, based on the gypsum component, of a mixture of alkyl aryl sulphonates selected from the group alkyl benzene sulphonates and alkyl phenol sulphonates whose alkyl groups are nuclear substituents and are derived from a kerosene fraction whose boiling range indicates that it consists predominantly of hydrocarbons containing 13 to 16 carbon atoms per molecule.

GUY W. TALBERT.